United States Patent
Bichler et al.

(10) Patent No.: US 9,522,996 B2
(45) Date of Patent: Dec. 20, 2016

(54) COMPOSITION COMPRISING A COPOLYMER

(71) Applicant: BASF SE, Ludwigshafen (DE)

(72) Inventors: Manfred Bichler, Engelsberg (DE); Michael Schinabeck, Altenmarkt (DE); Torben Gädt, Traunstein (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/761,840

(22) PCT Filed: Mar. 24, 2014

(86) PCT No.: PCT/EP2014/055780
§ 371 (c)(1),
(2) Date: Jul. 17, 2015

(87) PCT Pub. No.: WO2014/154600
PCT Pub. Date: Oct. 2, 2014

(65) Prior Publication Data
US 2016/0002454 A1  Jan. 7, 2016

(30) Foreign Application Priority Data
Mar. 26, 2013 (EP) .................................... 13161138

(51) Int. Cl.
| | | |
|---|---|---|
| C08L 33/02 | (2006.01) | |
| C04B 28/02 | (2006.01) | |
| C04B 28/16 | (2006.01) | |
| C04B 40/00 | (2006.01) | |

(52) U.S. Cl.
CPC ................ *C08L 33/02* (2013.01); *C04B 28/02* (2013.01); *C04B 28/16* (2013.01); *C04B 40/0039* (2013.01); *C08L 2201/56* (2013.01)

(58) Field of Classification Search
CPC .............................. C08L 33/02; C08L 2201/56
See application file for complete search history.

(56) References Cited

U.S. PATENT DOCUMENTS

| 4,203,877 A | 5/1980 | Baker |
| 4,528,321 A | 7/1985 | Allen et al. |
| 4,725,665 A | 2/1988 | Pieh et al. |
| 5,798,425 A | 8/1998 | Albrecht et al. |
| 6,211,317 B1 | 4/2001 | Albrecht et al. |
| 6,437,027 B1 * | 8/2002 | Isomura ................ C04B 24/165 524/5 |
| 6,569,924 B2 | 5/2003 | Shendy et al. |
| 6,620,879 B1 * | 9/2003 | Albrecht ............. C04B 20/1033 521/106 |
| 6,869,988 B2 * | 3/2005 | Schwartz ............ C04B 20/1033 524/4 |
| 6,946,510 B2 | 9/2005 | Suau et al. |
| 7,973,110 B2 | 7/2011 | Lorenz et al. |
| 7,994,259 B2 | 8/2011 | Sulser et al. |
| 8,242,218 B2 | 8/2012 | Lorenz et al. |
| 8,273,814 B2 | 9/2012 | Sulser et al. |
| 8,349,979 B2 | 1/2013 | Hommer et al. |
| 8,481,116 B2 * | 7/2013 | Bleibler ................. C04B 20/10 106/608 |
| 8,519,029 B2 | 8/2013 | Lorenz et al. |
| 2005/0143511 A1 | 6/2005 | Suau et al. |
| 2009/0312460 A1 | 12/2009 | Lorenz et al. |
| 2010/0210761 A1 | 8/2010 | Hommer et al. |
| 2011/0040025 A1 | 2/2011 | Deroo et al. |
| 2011/0245379 A1 | 10/2011 | Sulser et al. |

FOREIGN PATENT DOCUMENTS

| CN | 101962273 A | 2/2011 |
| DE | 29 48 698 A1 | 6/1981 |
| DE | 35 30 258 A1 | 2/1987 |
| DE | 195 13 126 A1 | 10/1996 |
| DE | 198 34 173 A1 | 2/1999 |
| DE | 199 05 488 A1 | 8/2000 |
| EP | 0 000 424 A1 | 1/1979 |
| EP | 0 126 528 A2 | 11/1984 |
| EP | 0 287 138 A1 | 10/1988 |
| EP | 1 052 232 A1 | 11/2000 |
| EP | 1 577 327 A1 | 9/2005 |
| EP | 1 889 858 A1 | 2/2008 |
| EP | 2 020 422 A1 | 2/2009 |
| WO | 01/42162 A1 | 6/2001 |
| WO | 01/96007 A1 | 12/2001 |
| WO | 2006/027363 A1 | 3/2006 |
| WO | 2006/084588 A2 | 8/2006 |
| WO | 2006/133933 A2 | 12/2006 |

* cited by examiner

*Primary Examiner* — Robert Harlan
(74) *Attorney, Agent, or Firm* — Oblon, McClelland, Maier & Neustadt, L.L.P.

(57) ABSTRACT

The invention relates to a composition comprising 1 to 70 wt % of at least one copolymer obtainable by polymerizing a mixture of monomers comprising (I) at least one ethylenically unsaturated monomer which comprises at least one radical from the series carboxylic acid, carboxylic salt, carboxylic ester, carboxylic amide, carboxylic anhydride, and carboxylic imide, and (II) at least one ethylenically unsaturated monomer having a polyalkylene oxide radical, 0.01 to 10 wt % of at least one emulsifier, and 30 to 98 wt % of at least one hydrocarbon liquid at 20° C. or a hydrocarbon mixture. Also disclosed are a process for preparing the composition, and a pulverulent mixture comprising the composition of the invention.

15 Claims, No Drawings

COMPOSITION COMPRISING A COPOLYMER

This application is a §371 of International Application No. PCT/EP2014/055780 filed Mar. 24, 2014, and claims priority from European Patent Application No. 13161138.6 filed Mar. 26, 2013.

The invention relates to a composition comprising a copolymer, an emulsifier, and a hydrocarbon liquid at 20° C. or a hydrocarbon mixture. Further disclosed are a process for preparing the composition and also the use thereof in a pulverulent mixture, more particularly in a dry-mix mortar.

In order to achieve improved processing qualities, i.e., kneadability, spreadability, sprayability, pumpability, or fluidity, for inorganic suspensions of solids, such suspensions are often admixed with admixtures in the form of dispersants or plasticizers. Inorganic solids of these kinds in the construction industry usually comprise inorganic binders such as, for example, cement based on Portland cement (EN 197), cement with particular qualities (DIN 1164), white cement, calcium aluminate cement or high-alumina cement (EN 14647), calcium sulfoaluminate cement, specialty cements, calcium sulfate n-hydrate (n=0 to 2), lime or building lime (EN 459) and also pozzolans and latent hydraulic binders such as flyash, metakaolin, silica dust, and slag sand, for example. The inorganic suspensions of solids generally further comprise fillers, more particularly aggregate consisting of, for example, calcium carbonate, quartz, or other natural rocks in different granular sizes and granular morphologies, and also further inorganic and/or organic additives (admixtures) for the targeted influencing of properties of chemical-based construction products, such as hydration kinetics, rheology, or air content, for example. Additionally it is possible for organic binders to be present, such as latex powders, for example.

In order to convert building material mixtures, especially those based on inorganic binders, into a ready-to-use, processable form, it is generally necessary to use substantially more mixing water than theoretically required for the subsequent hydration or hardening process. The void fraction in the building element, formed by the excess water that subsequently evaporates, results in significantly impaired mechanical strength, stability, and durability of adhesion.

In order to reduce this excess water fraction in the case of a given processing consistency and/or in order to improve the processing properties in the case of a given water/binder ratio, admixtures are used which within the construction chemicals segment are generally referred to as water reducers or plasticizers. Known such admixtures include, in particular, polycondensation products based on naphthalenesulfonic or alkylnaphthalenesulfonic acids, or melamine-formaldehyde resins containing sulfonic acid groups.

DE 3530258 describes the use of water-soluble sodium naphthalenesulfonic acid-formaldehyde condensates as admixtures for inorganic binders and building materials. These admixtures are described for improving the fluidity of the binders such as cement, anhydride, or gypsum, for example, and also the building materials produced using them.

DE 2948698 describes hydraulic mortars for screeds that comprise plasticizers based on melamine-formaldehyde condensation products, and/or sulfonated formaldehyde-naphthalene condensates and/or lignosulfonate, and comprising, as binders, Portland cement, clay-containing lime marl, clay clinker and soft-fired clinker.

In addition to the purely anionic plasticizers, which comprise essentially carboxylic acid groups and sulfonic acid groups, a more recent group of plasticizers described comprises weakly anionic comb polymers, which typically carry anionic charges on the main chain and include nonionic polyalkylene oxide side chains.

WO 01/96007 describes these weakly anionic plasticizers and grinding assistants for aqueous mineral suspensions which are prepared by radical polymerization of monomers containing vinyl groups and which include polyalkylene oxide groups as a main component.

DE 19513126 and DE 19834173 describe copolymers based on unsaturated dicarboxylic acid derivatives and oxyalkylene glycol alkenyl ethers and the use thereof as admixtures for hydraulic binders, more particularly cement.

The aim of adding plasticizers in the construction industry is either to increase the plasticity of the binder system or to reduce the amount of water required under given processing conditions.

It has emerged that plasticizers based on lignosulfonate, melaminesulfonate, and polynaphthalenesulfonate are significantly inferior in their activity to the weakly anionic, polyalkylene oxide-containing copolymers. These copolymers are also referred to as polycarboxylate ethers (PCEs). Polycarboxylic ethers not only disperse the inorganic particles via electrostatic charging, owing to the anionic groups (carboxylate groups, sulfonate groups) present on the main chain, but also, furthermore, stabilize the dispersed particles by steric effects, owing to the polyalkylene oxide side chains, which by absorbing water molecules form a stabilizing protective layer around the particles.

As a result, it is either possible to reduce the required amount of water for the formulating of a particular consistency, as compared with the conventional plasticizers, or else the addition of the polycarboxylate ethers reduces the plasticity of the wet building-material mixture to such an extent that it is possible to produce self-compacting concrete or self-compacting mortar with low water/cement ratios. The use of the polycarboxylate ethers also makes it possible to produce ready-mixed concrete or ready-mixed mortar that remains pumpable for lengthy periods of time, or to produce high-strength concretes or high-strength mortars through the formulation of a low water/cement ratio.

In addition to the polycarboxylate ethers described, a series of derivatives with a modified activity profile have also since become known. Thus, for example, US 2009312460 describes polycarboxylate esters, the ester function being hydrolyzed, following introduction into an aqueous, cementitious mixture and thereby forming a polycarboxylate ether. An advantage of polycarboxylate esters is that they develop their activity in the cementitious mixture only after a certain time, and consequently the dispersing effect can be maintained over a lengthy period of time.

Dispersants based on polycarboxylate ethers and derivatives thereof are available either as solids in powder form or as aqueous solutions. Polycarboxylate ethers in powder form can be admixed to a factory dry-mix mortar, for example, in the course of its production. When the dry-mix mortar is batched with water, the polycarboxylate ethers dissolve and are able subsequently to develop their effect.

Alternatively it is also possible to add polycarboxylate ethers or derivatives thereof to the inorganic suspension of solids in dissolved form. The dispersant may more particularly be metered directly into the mixing water.

A disadvantage of all existing methods for incorporating plasticizers into an inorganic suspension of solids, however, is that the dispersing activity does not develop immediately after addition of the mixing water. Irrespective of whether the dispersant is added as a powder or an aqueous solution, it may take more than 100 seconds, for example, in a dry mortar—depending on water-to-cement ratio (w/c) or water demand—for a homogeneous suspension to form with vigorous stirring after the addition of the mixing water. This delay is a problem particularly in the context of the use of mixing pumps.

It was an object of the present invention, accordingly, to provide pulverulent mixtures, particularly comprising an inorganic binder, which can be homogeneously dispersed with water more rapidly than has been possible with the existing compositions.

This object has been achieved by means of a composition comprising 1 to 70 wt %, preferably 20 to 50 wt %, of at least one copolymer obtainable by polymerizing a mixture of monomers comprising
(I) at least one ethylenically unsaturated monomer which comprises at least one radical from the series carboxylic acid, carboxylic salt, carboxylic ester, carboxylic amide, carboxylic anhydride, and carboxylic imide, and
(II) at least one ethylenically unsaturated monomer having a polyalkylene oxide radical,
0.01 to 10 wt %, preferably 1 to 3 wt %, of at least one emulsifier, and
29 to 98 wt %, preferably 50 to 80 wt %, of at least one hydrocarbon liquid at 20° C. or a hydrocarbon mixture.

Surprisingly it has been found here not only that the stated object can be fully achieved but also that a pulverulent mixture, which may in particular comprise an inorganic binder, exhibits excellent processing properties after the composition of the invention has been added, in addition to the outstanding dispersibility at the same time. More particularly it has been possible to observe a marked reduction in dusting during handling of the pulverulent composition. A further surprise was that the shelf life of the pulverulent composition of the invention was not impaired, or not substantially impaired, by the liquid component.

The at least one hydrocarbon liquid at 20° C. or hydrocarbon mixture of the invention is preferably at least one aliphatic hydrocarbon or a hydrocarbon mixture, more particularly linear or branched, preferably linear, saturated or unsaturated, preferably at least one saturated aliphatic hydrocarbon or a hydrocarbon mixture, preferably having boiling points or boiling ranges of 100 to 400° C., more particularly 150 to 350° C., preferably 200 to 300° C., based on atmospheric pressure.

The aliphatic hydrocarbons or hydrocarbon mixtures that are used with preference may, however, include certain aromatic fractions, more particularly aromatic hydrocarbons; this is the case in particular when technical-grade hydrocarbons or hydrocarbon mixtures are employed, examples being technical-grade mineral oils, which often include aromatic fractions. In such a case, the aromatic fraction, based on the total hydrocarbons or total hydrocarbon mixtures employed, ought advantageously not to exceed 30 wt %, preferably 20 wt %, more preferably 17.5 wt %, very preferably 15 wt %.

If the aliphatic hydrocarbons or hydrocarbon mixtures having the aforementioned properties, more particularly having the aforementioned boiling points and boiling ranges, also comprise aromatic fractions, examples being aromatic hydrocarbons, then their boiling points or boiling ranges ought advantageously to be above 100° C., more particularly above 150° C., preferably above 200° C. This has the advantage that aromatic hydrocarbons of this kind are generally not volatile, and so the treated pulverulent mixtures comprising an inorganic binder are odorless or of low odor. It also ensures, furthermore, that the processing properties and application properties of the pulverulent mixtures treated in this way and comprising an inorganic binder are unaffected, or not significantly affected.

In one particularly preferred embodiment of the present invention, the hydrocarbon liquid at 20° C. or hydrocarbon mixture comprises at least one hydrocarbon or a hydrocarbon mixture having more than 10 carbon atoms, more particularly more than 15 carbon atoms, preferably more than 20 carbon atoms, and/or the at least one hydrocarbon liquid at 20° C. or hydrocarbon mixture comprises at least one hydrocarbon or a hydrocarbon mixture having a carbon number of between 10 and 100, preferably between 10 and 40, more preferably between 15 and 30, and/or the hydrocarbon liquid at 20° C. or hydrocarbon mixture comprises at least one hydrocarbon or a hydrocarbon mixture having a weight-average molecular mass of 100 to 4000 g/mol, more particularly 100 to 2000 g/mol, preferably 150 to 1000 g/mol, more preferably 200 to 750 g/mol, very preferably 250 to 500 g/mol.

It is additionally considered preferable for the hydrocarbons or hydrocarbon mixtures employed to possess a kinematic viscosity (ISO 3014 or DIN 51 562/T1) at 20° C. in the range from 30 to 150 mm$^2$/s, more particularly 30 to 100 mm$^2$/s, and/or for the hydrocarbons or hydrocarbon mixtures to possess a kinematic viscosity (ISO 3014 or DIN 51 562/T1) at 40° C. in the range from 10 to 100 mm$^2$/s, more particularly 15 to 50 mm$^2$/s, and/or for the hydrocarbons or hydrocarbon mixtures to possess a kinematic viscosity (ISO 3014 or DIN 51 562/T1) at 100° C. in the range from 1 to 10 mm$^2$/s.

With preference in accordance with the invention, the hydrocarbons or hydrocarbon mixtures employed have densities in the range from 800 to 900 kg/m$^3$, more particularly 825 to 875 kg/m$^3$. It is also preferable for the hydrocarbon liquid at 20° C. and employed in accordance with the invention, or the hydrocarbon mixture, to have a loss on evaporation at a temperature of 107° C. over 24 hours of less than 5 wt %, preferably of less than 2 wt %, more preferably of less than 1 wt %, based on the hydrocarbons or hydrocarbon mixtures. This ensures that the pulverulent mixture of the invention, comprising an inorganic binder, is at least substantially odorless or of low odor, since no hydrocarbons or hydrocarbon mixtures are released in significant amounts.

The copolymers in accordance with the present invention comprise at least two monomer units. It may, though, also be advantageous to use copolymers having three or more monomer units.

In one preferred embodiment, the ethylenically unsaturated monomer (I) is represented by at least one of the following general formulae from the group (Ia), (Ib), and (Ic):

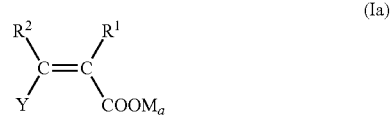

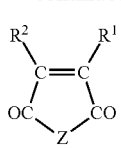

For the monocarboxylic or dicarboxylic acid derivative (Ia) and for the monomer (Ib) in cyclic form, where Z represents O (acid anhydride) or $NR^2$ (acid imide), $R^1$ and $R^2$ independently of one another are hydrogen or an aliphatic hydrocarbon radical having 1 to 20 C atoms, preferably a methyl group. Y is H, —$COOM_a$, —CO—O($C_qH_{2q}O)_r$—$R^3$, or —CO—NH—$(C_qH_{2q}O)_r$—$R^3$.

M is hydrogen, a monovalent or divalent metal cation, preferably sodium, potassium, calcium, or magnesium ion, additionally ammonium or an organic amine radical, and a=½ or 1, according to whether M is a monovalent or a divalent cation. Organic amine radicals used are preferably substituted ammonium groups deriving from primary, secondary, or tertiary $C_{1-20}$ alkylamines, $C_{1-20}$ alkanolamines, $C_{5-8}$ cycloalkylamines, and $C_{6-14}$ arylamines. Examples of the amines in question are methylamine, dimethylamine, trimethylamine, ethanolamine, diethanolamine, triethanolamine, methyldiethanolamine, cyclohexylamine, dicyclohexylamine, phenylamine, and diphenylamine in the protonated (ammonium) form.

$R^3$ is hydrogen, an aliphatic hydrocarbon radical having 1 to 20 C atoms, a cycloaliphatic hydrocarbon radical having 5 to 8 C atoms, an aryl radical having 6 to 14 carbon atoms, it being possible optionally for this radical to be substituted, q=2, 3, or 4, and r=0 to 200, preferably 1 to 150. The aliphatic hydrocarbons here may be linear or branched and also saturated or unsaturated. Preferred cycloalkyl radicals are considered to be cyclopentyl or cyclohexyl radicals, and preferred aryl radicals are considered to be phenyl or naphthyl radicals, which in particular may also be substituted by hydroxyl, carboxyl, or sulfonic acid groups.

The following formula represents the monomer (Ic):

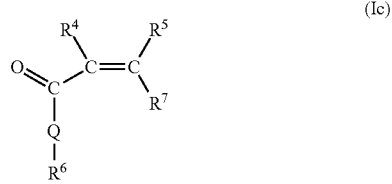

In this formula, $R^4$ and $R^5$ independently of one another are hydrogen or an aliphatic hydrocarbon radical having 1 to 20 C atoms, a cycloaliphatic hydrocarbon radical having 5 to 8 C atoms, an optionally substituted aryl radical having 6 to 14 C atoms. Q may be identical or different and is represented by NH, $NR^3$, or O, with $R^3$ possessing the definitions stated above.

Furthermore, $R^6$ is identical or different and is represented by $(C_nH_{2n})$—$SO_3H$ with n=0, 1, 2, 3, or 4, $(C_nH_{2n})$—OH with n=0, 1, 2, 3, or 4; $(C_nH_{2n})$—$PO_3H_2$ with n=0, 1, 2, 3, or 4, $(C_nH_{2n})$—$OPO_3H_2$ with n=0, 1, 2, 3, or 4, $(C_6H_4)$—$SO_3H$, $(C_6H_4)$—$PO_3H_2$, $(C_6H_4)$—$OPO_3H_2$, and $(C_nH_{2n})$—$NR^8_b$ with n=0, 1, 2, 3, or 4 and b=2 or 3.

$R^7$ is H, —$COOM_a$, —CO—O$(C_qH_{2q}O)_r$—$R^3$, or —CO—NH—$(C_qH_{2q}O)_r$—$R^3$, where $M_a$, $R^3$, q, and r possess the definitions stated above.

$R^8$ is hydrogen, an aliphatic hydrocarbon radical having 1 to 10 C atoms, a cycloaliphatic hydrocarbon radical having 5 to 8 C atoms, or an optionally substituted aryl radical having 6 to 14 C atoms.

With further preference in the sense of the present invention, the ethylenically unsaturated monomer (II) is represented by the following general formula:

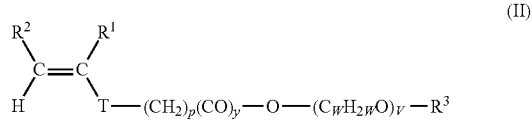

where p is an integer between 0 and 6, y is 0 or 1, v is an integer between 3 and 250, and w independently at each occurrence for each $(C_wH_{2w}O)$ unit is identical or different and is an integer between 2 and 18, and also T is oxygen or a chemical bond. $R^1$, $R^2$, and $R^3$ possess the definition stated above.

In one preferred embodiment, in the general formula (II), p is an integer between 0 and 4, v is an integer between 5 and 250, and w independently at each occurrence for each $(C_wH_{2w}O)$ unit is identical or different and is 2 or 3.

In one particularly preferred embodiment, in the general formula (II), p is 4, v is an integer between 10 and 120, and w independently at each occurrence for each $(C_wH_{2w}O)$ unit is identical or different and is 2 or 3, T is oxygen, and y is 0. In this case it is particularly preferred for at least one subregion to be formed by a random ethylene oxide/propylene oxide copolymer and for the molar fraction of propylene oxide units to be preferably 10 to 30 mol %, based on the sum of the ethylene oxide units and propylene oxide units in the random ethylene oxide/propylene oxide copolymer or in the corresponding subregion.

More particularly the at least one ethylenically unsaturated monomer having a polyalkylene oxide radical (II) may be a compound of the formula (III). The block A consists of a polyethylene oxide unit, with n preferably representing a number from 20 to 30. The block B consists of a random ethylene oxide/propylene oxide copolymer unit, with k preferably representing a number from 5 to 10 and l preferably representing a number from 20 to 35.

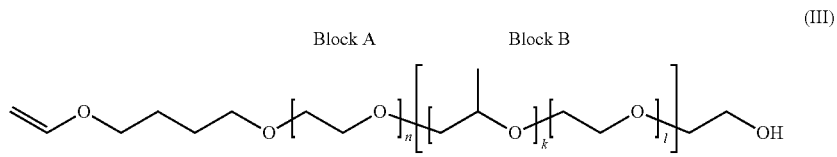

In a further-preferred embodiment of the invention, the ethylenically unsaturated monomer (II) comprises at least one compound of the general formulae (IV), (V), (VI), and (VII),

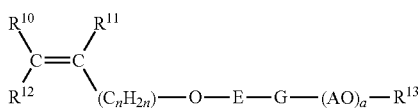
(IV)

where
$R^{10}$, $R^{11}$, and $R^{12}$ are each identical or different and independently of one another represented by H and/or an unbranched or branched $C_1$-$C_4$ alkyl group, preferably H and/or $CH_3$;
E is identical or different and is represented by an unbranched or branched $C_1$-$C_6$ alkylene group, more particularly $C_1$, $C_2$, $C_3$, $C_4$, $C_5$, or $C_6$, admittedly in each case typically, but preferably $C_2$ and $C_4$, a cyclohexyl group, $CH_2$—$C_6H_{10}$, $C_6H_4$ present in ortho, meta, or para substituted form, and/or an absent unit, i.e., E is not present;
G is identical or different and is represented by O, NH and/or CO—NH, with the proviso that if E is an absent unit, G is also an absent unit, i.e., G is not present;
A is identical or different and is represented by $C_xH_{2x}$ with x=2, 3, 4 and/or 5, preferably x=2, and/or $CH_2CH(C_6H_5)$;
n is identical or different and is represented by 0, 1, 2, 3, 4 and/or 5;
a is identical or different and is represented by an integer from 2 to 350, preferably 10-200;
$R^{13}$ is identical or different and is represented by H, an unbranched or branched $C_1$-$C_4$ alkyl group, CO—$NH_2$, and/or $COCH_3$, preferably H or $CH_3$;

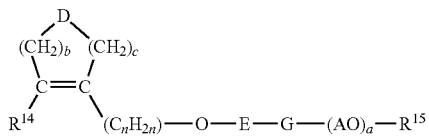
(V)

where
$R^{14}$ is identical or different and is represented by H and/or an unbranched or branched $C_1$-$C_4$ alkyl group, preferably H;
E is identical or different and is represented by an unbranched or branched $C_1$-$C_6$ alkylene group, preferably $C_2H_4$, a cyclohexyl group, $CH_2$—$C_6H_{10}$, $C_6H_4$ present in ortho, meta, or para substituted form, and/or by an absent unit, i.e., E is not present;
G is identical or different and is represented by an absent unit, O, NH and/or CO—NH, with the proviso that if E is an absent unit, G is also an absent unit, i.e., G is not present;
A is identical or different and is represented by $C_xH_{2x}$ with x=2, 3, 4, and/or 5, preferably x=2, and/or $CH_2CH(C_6H_5)$;
n is identical or different and is represented by 0, 1, 2, 3, 4 and/or 5;
a is identical or different and is represented by an integer from 2 to 350, preferably 10-200;
D is identical or different and is represented by an absent unit, i.e., D is not present, or by NH and/or O, with the proviso that if D is an absent unit: b=0, 1, 2, 3, or 4 and also c=0, 1, 2, 3, or 4, with b+c=3 or 4, and
with the proviso that if D is NH and/or O: b=0, 1, 2, or 3, c=0, 1, 2, or 3, and b+c=2 or 3;
$R^{15}$ is identical or different and is represented by H, an unbranched or branched $C_1$-$C_4$ alkyl group, CO—$NH_2$, and/or $COCH_3$, preferably H;

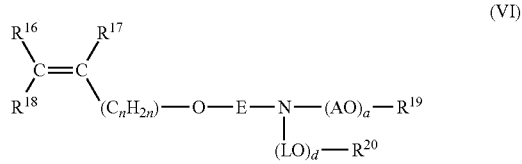
(VI)

where
$R^{16}$, $R^{17}$, and $R^{18}$ are each identical or different and independently of one another are represented by H and/or an unbranched or branched $C_1$-$C_4$ alkyl group, preferably H and/or $CH_3$;
E is identical or different and is represented by an unbranched or branched $C_1$-$C_6$ alkylene group, preferably $C_2H_4$ or $C_4H_8$, a cyclohexyl group, $CH_2$—$C_6H_{10}$, $C_6H_4$ present in ortho, meta, or para substituted form, and/or an absent unit, i.e., E is not present;
A is identical or different and is represented by $C_xH_{2x}$ with x=2, 3, 4 and/or 5, preferably x=2, and/or $CH_2CH(C_6H_5)$;
n is identical or different and is represented by 0, 1, 2, 3, 4 and/or 5;
L is identical or different and is represented by $C_xH_{2x}$ with x=2, 3, 4 and/or 5, preferably x=2, and/or $CH_2$—$CH(C_6$—$H_5)$;
a is identical or different and is represented by an integer from 2 to 350, preferably 10-200;
d is identical or different and is represented by an integer from 1 to 350, preferably 10-200;
$R^{19}$ is identical or different and is represented by H and/or an unbranched or branched $C_1$-$C_4$ alkyl group, preferably H,
$R^{20}$ is identical or different and is represented by H and/or an unbranched $C_1$-$C_4$ alkyl group, preferably H.

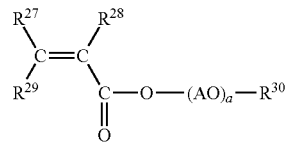
(VII)

in which
$R^{27}$, $R^{28}$, and $R^{29}$ are identical or different and independently of one another are H and/or an unbranched or branched $C_1$-$C_4$ alkyl radical;
A are identical or different and denote $C_xH_{2x}$ with x=2, 3, 4 and/or 5 and/or $CH_2CH(C_6H_5)$;
a are identical or different and are an integer between 2 and 350;
$R^{30}$ are identical or different and are H and/or an unbranched or branched $C_1$-$C_4$ alkyl radical.

Generally it can be said that the polyalkoxy side chains $(AO)_a$ of the polyether macro-monomers are very preferably pure polyethoxy side chains, although there may preferably also be mixed polyalkoxy side chains present, more particularly those which contain both propoxy groups and ethoxy groups.

In practice the polyether macromonomer frequently used is alkoxylated isoprenol, i.e., alkoxylated 3-methyl-3-buten-1-ol, and/or alkoxylated hydroxybutyl vinyl ether and/or alkoxylated (meth)allyl alcohol, with allyl alcohol being preferred over methallyl alcohol, having normally in each case an arithmetically mean number of oxyalkylene groups of 4 to 350. Particularly preferred is alkoxylated hydroxybutyl vinyl ether.

Besides the monomers (I) and (II) there may also be further types of monomer employed in the copolymer of the invention.

The molar fraction of the monomers (I) and (II) in the copolymer of the invention may be selected freely within wide ranges. It has proven particularly advantageous if the fraction of the monomer (I) in the copolymer is 5 to 90 mol %, preferably 30 to 85 mol %, and more particularly 55 to 80 mol %. In a further-preferred embodiment, the fraction of the monomer (II) in the copolymer is 10 to 95 mol %, more particularly 15 to 70 mol %, and more preferably 20 to 45 mol %.

In a further-preferred embodiment, copolymers of the invention used may also be those with amide groups and ester groups, which are preparable by reaction of homopolymers or copolymers of (meth)acrylic acid with a monohydroxy compound at a temperature up to 200° C., forming not only ester groups but also anhydride groups, with the anhydride groups formed being reacted, in a subsequent step, with a monoamine compound at temperatures below 100° C.

The content of EP 1 577 327 A1, which pertains, among other things, to the preparation of copolymers having amide groups and ester groups, is incorporated in full by reference into the present specification. More particularly suitable as copolymers are the compounds described on page 3, line 27 to page 8, line 17.

It is considered preferable for the monomer (II) to have a molecular weight of 500 to 10000 g/mol.

In one preferred embodiment, the copolymer of the invention possesses a molecular weight of 10000 to 100000 g/mol, determined by gel permeation chromatography against polyethylene glycol standards.

The composition of the invention may also comprise water. In the case of use in pulverulent mixtures comprising an inorganic binder, a high water content in the liquid component may result in a deterioration in the shelf life of the pulverulent mixture. This is dependent in particular on the inorganic binder employed. The water content of the composition of the invention is therefore more preferably <5 wt %, more particularly <3 wt %, and very preferably less than 2 wt %. Accordingly, in particular, the use of water scavengers in the pulverulent mixture may be advantageous. These water scavengers bind water either into their crystal structure, or consume the water by other mechanisms, before the binder can react with it and before an adverse effect on product qualities is caused. The scavenger in question may more particularly be at least one molecular sieve or may comprise salts which bind water quickly, such as CaO, for example. Water scavengers can lead to high water tolerance on the part of the pulverulent mixture of the invention, and in that case no deterioration is observed in the shelf life of the pulverulent composition of the invention.

In one preferred embodiment of the present invention, the emulsifier comprises at least one emulsifier suitable for emulsion polymerizations.

In one particularly preferred embodiment, the emulsifier is a copolymer. Suitable more particularly are amphiphilic diblock copolymers with a hydrophilic block and a hydrophobic block, the hydrophobic block being the heavier block. These copolymers are obtainable by blockwise controlled radical polymerization (RAFT, MADIX, ATRP, etc.). Particularly suitable examples are poly(ethylhexyl acrylate-block-vinylpyrrolidone) and poly(acrylic acid-block-butyl acrylate). The emulsifier is employed with particular preference in the form of a dispersion.

The content of EP 1 889 858 B1, which pertains, among other things to these above-listed compounds and to the preparation of diblock copolymers, is incorporated fully by reference into the present specification. More particularly suitable as emulsifiers are the compounds described on page 4, line 29 to page 13, line 8.

Also suitable as polymeric emulsifiers are the A-B-A triblock copolymer structures described in EP 0 000 424 A1. These are polyester-PEG-polyester structures. The content of EP 0 000 424 A1, which pertains, among other things, to these above-listed compounds and to the preparation of A-B-A triblock copolymer structures, is incorporated fully by reference into the present specification. More particularly suitable as emulsifiers are the compounds described on page 1, line 1 to page 16, line 27.

Likewise highly suitable polymeric stabilizers for water-in-oil suspensions are copolymers of ceto-stearyl methacrylate and methacrylate. These and other copolymers are described in publications including EP 0 126 528 A1. The content of EP 0 126 528 A1 is incorporated fully by reference into the present specification. More particularly suitable as emulsifiers are the compounds described on page 4, line 25 to page 23, line 33.

In one particularly preferred embodiment, the emulsifier of the invention is an emulsifier based on a copolymer comprising water-soluble monomers (A) and water-insoluble monomers (B). The corresponding structures may be arranged blockwise, e.g., poly(A-block-B) or poly(A-block-B-block-A) or poly(B-block-A-block-B), or else may be randomly distributed, e.g., poly(A-ran-B), or else may be distributed in alternation, e.g., poly(A-alt-B).

Also suitable for stabilizing the water-in-oil or polymer-in-oil dispersion are mixtures of polymeric emulsifiers or stabilizers and surfactants. Use may be used here of anionic, cationic, or nonionic surfactants in combination with the abovementioned polymeric emulsifiers.

In one preferred embodiment, the composition of the invention consists of at least one copolymer, at least one emulsifier, and at least one hydrocarbon liquid at 20° C. or hydrocarbon mixture.

A suitable solvent in the preparation of the copolymers of the invention is water in particular. The possibility also exists, though, of using a mixture of water and an organic solvent, in which case the solvent ought to be very largely inert in its behavior with respect to radical polymerization reactions.

The polymerization reaction takes place preferably in the temperature range between 0 and 180° C., more preferably between 10 and 100° C., and also under atmospheric pressure or under elevated or reduced pressure. The polymerization may optionally also be performed under an inert gas atmosphere, preferably under nitrogen.

To initiate the polymerization it is possible to use high-energy electromagnetic radiation, mechanical energy, or chemical polymerization initiators such as organic peroxides, examples being benzoyl peroxide, tert-butyl hydroperoxide, methyl ethyl ketone peroxide, cumoyl peroxide, dilauroyl peroxide, or azo initiators, such as azodiisobutyronitrile, azobisamidopropyl hydrochloride, and 2,2'-azobis (2-methyl-butyronitrile), for example. Likewise suitable are inorganic peroxy compounds, such as ammonium peroxodisulfate, potassium peroxodisulfate, or hydrogen peroxide, for example, optionally in combination with reducing agents (e.g., sodium hydrogensulfite, ascorbic acid, iron(II) sulfate) or redox systems, which as reducing component comprise an aliphatic or aromatic sulfonic acid (e.g., benzenesulfonic acid, toluenesulfonic acid).

Particular preference is given to a mixture of at least one sulfinic acid with at least one iron(III) salt, and/or to a mixture of ascorbic acid with at least one iron(III) salt.

Chain transfer agents used, which regulate the molecular weight, are the customary compounds. Suitable known such agents are, for example, alcohols, such as methanol, ethanol, propanol, isopropanol, n-butanol, sec-butanol. and amyl alcohols, aldehydes, ketones, alkylthiols, such as dodecylthiol and tert-dodecylthiol, for example, thioglycolic acid, isooctyl thioglycolate, 2-mercaptoethanol, 2-mercaptopropionic acid, 3-mercaptopropionic acid, and some halogen compounds, such as carbon tetrachloride, chloroform, and methylene chloride, for example.

In an alternative further embodiment the process for preparing the copolymers of the invention may also be carried out in an organic solvent or in a mixture of two or more organic solvents.

In one particular embodiment, the polymerization of the monomers (I) and (II) is carried out in a water-containing solvent, with the water content of the overall reaction mixture being more than 20 wt %, preferably between 30 and 75 wt %. The polymerization product is subsequently admixed with the emulsifier and the at least one hydrocarbon liquid at 20° C. or hydrocarbon mixture, and the water is removed. In this context it is particularly preferred if shearing power of more than $10^3$ W/m$^3$, more particularly more than $10^4$ W/m$^3$, very preferably more than $10^6$ W/m$^3$, is introduced into the composition before the water is removed. The copolymer in the water-containing solvent is preferably mixed first of all with the emulsifier and with the at least one hydrocarbon liquid at 20° C. or hydrocarbon mixture, this mixing possibly taking place by means of a paddle stirrer, for example. Subsequently, as already described, the shearing power is introduced, something which may be done, for example, using at least one device from the series toothed colloid mill, bead mill, ultrasound devices, rotor-stator (e.g., IKA Ultra-Turrax), and dissolver disk. The subsequent removal of the water may be carried out by any of the processes known to the skilled person for such removal. In particular, thin-film evaporation or distillation have proven particularly suitable.

In a further-preferred embodiment, it is additionally possible for other additives to be admixed to the composition of the invention, depending on intended use. More particularly the composition, based on the overall mixture, may comprise 0.5 to 69 wt % of at least one further additive. By this means, when the composition of the invention is used in a pulverulent mixture, one or more further additives may be introduced in a simple way, this representing a typically economical procedure and possibly also obviating a separate drying step. Through the particularly homogeneous distribution of the at least one further additive, this effect can be improved immediately after batching with water, and this is considered a further advantage of this embodiment. The further additives may more particularly be at least one from the series consisting of plasticizers, defoamers, stabilizers, water retention agents, thickeners, flow control agents, dedusting agents, and pigments.

Additionally provided with the present invention is a pulverulent mixture comprising the composition of the invention. Depending on the specific composition, the pulverulent mixture may comprise 0.01 to 50 wt %, 0.01 to 10 wt %, or 0.05 to 2 wt % of the composition of the invention, based on the overall mass of the pulverulent mixture. The contacting of the pulverulent mixtures with the composition of the invention may take place in any way known to the skilled person for that purpose. It has proven particularly suitable for the composition of the invention to be contacted with the powder by spray application or atomizing, the method preferably comprising a mixing step. In this way it is possible to ensure homogeneous application in a simple way with accompanying good adhesion and initial adhesion. The contacting of the powder with the liquid component may of course also be accomplished in any other suitable way. Contemplated here more particularly are also blending or stirring in, although there is a clear preference for spray application because it constitutes the most simple and most economically attractive form of application.

Additionally provided with the present invention is the use of the composition of the invention in a pulverulent mixture for accelerating the development of the dispersing effect of the copolymer over time following addition of the mixing water, with 0.01 to 10 wt %, more particularly 0.05 to 2 wt %, of the composition of the invention being used, based on the overall mass.

It is particularly preferred here for the pulverulent mixture to comprise an inorganic binder and/or an inorganic filler. In one specific embodiment, the pulverulent mixture consists to an extent of at least 80 wt %, more particularly at least 90 wt %, and very preferably more than 95 wt %, of an inorganic binder and/or an inorganic filler. The inorganic binder may more particularly be at least one from the series of cement based on Portland cement, white cement, calcium aluminate cement, calcium sulfoaluminate cement, calcium sulfate n-hydrate, or latent hydraulic or pozzolanic binder such as, for example, fly ash, metakaolin, silica dust, and slag sand. Particularly preferred are cement based on Portland cement, calcium sulfate hemihydrate, calcium sulfate anhydrite, and calcium aluminate cement. The inorganic filler may preferably be at least one from the series of silica sand, finely ground quartz, limestone, heavy spar, calcite, dolomite, talc, kaolin, mica, and chalk.

In one particularly preferred embodiment the pulverulent mixture is a factory dry-mix mortar, more particularly masonry mortars, render mortars, mortars for thermal insulation composite systems, renovating renders, jointing mortars, tile adhesives, thin-bed mortars, screed mortars, casting mortars, injection mortars, filling compounds, grouts, or lining mortars. The factory dry-mix mortar here can be contacted directly with the composition of the invention, and this may take place in particular by spray application or atomizing. It is alternatively possible first to contact the inorganic binder with the composition of the invention, and to mix in the other components, more particularly inorganic fillers and additives, in a subsequent step. In one particularly preferred embodiment, the inorganic filler is first of all contacted with the composition of the invention, and the other components, more particularly inorganic binders and additives, are admixed in a subsequent step. In this case the pulverulent mixture consisting of inorganic filler and the composition of the invention may preferably comprise up to 90 wt % of the composition of the invention, based on the overall mass of the pulverulent mixture.

As a result of continual efforts toward substantial rationalization and improved product quality, mortars for a wide variety of uses in the construction sector are nowadays virtually no longer mixed together on the site itself from the starting materials. This function is nowadays largely carried out at the factory in the construction materials industry, and the ready-to-use mixtures are supplied in the form of what are called factory dry-mix mortars. Completed mixtures which can be made workable on site exclusively by addition of water and commixing are referred to according to DIN 18557 as factory mortars, more particularly as factory dry-mix mortars. Mortar systems of this kind may fulfill any of a very wide variety of physical construction objectives. Depending on the objective that exists, the binder, which may comprise cement and/or lime and/or calcium sulfate, for example, is admixed with further additives or admixtures in order to adapt the factory dry-mix mortar to the specific application. The additives and admixtures in question may include, for example, shrinkage reducers, expansion agents, accelerators, retardants, dispersants, thickeners, defoamers, air entrainers, and corrosion inhibitors.

In one particular embodiment the factory dry-mix mortar of the invention may also be a self-leveling underlayment composition. This is particularly advantageous since pulverulent compositions of this kind, for low layer thicknesses, are generally very fine and their mixing up with water is therefore comparatively slow.

The inorganic binder may also be gypsum. The expression "gypsum" is used synonymously in the present context with calcium sulfate, and the calcium sulfate may be present in its various anhydrous and hydrated forms with and without water of crystallization. Natural gypsum substantially comprises calcium sulfate dihydrate ("dihydrate"). The natural form of calcium sulfate, free from water of crystallization, is encompassed by the expression "anhydrite". As well as the naturally occurring forms, calcium sulfate is a typical byproduct of industrial operations, and is then referred to as "synthetic gypsum". One typical example of a synthetic gypsum from industrial operations is flue gas desulfurization. Synthetic gypsum, however, may equally also be formed as the byproduct of phosphoric acid or hydrofluoric acid production processes. Typical gypsum ($CaSO_4 \times 2\ H_2O$) can be calcined, with the water of crystallization being removed. Products of the wide variety of different calcination processes are α- or β-hemihydrate. β-Hemihydrate results from rapid heating in open vessels, accompanied by rapid evaporation of water, forming voids. α-Hemihydrate is produced by the dewatering of gypsum in closed autoclaves. The crystal habit in this case is relatively impervious, and so this binder requires less water for liquefaction than does β-hemihydrate. On the other hand, hemihydrate undergoes rehydration with water to form dihydrate crystals. Gypsum hydration customarily takes from several minutes to hours, resulting in a shortened working time in comparison to cements, which require several hours to days for complete hydration. These qualities make gypsum a useful alternative to cements as binders in a wide variety of areas. Moreover, fully cured gypsum products exhibit pronounced hardness and compressive strength.

The form selected for a wide variety of applications is β-hemihydrate, since it has better availability and exhibits numerous advantages from an economic standpoint. These advantages, however, are in part negated by the greater water demand of β-hemihydrate in use in order for fluid suspensions to be obtained at all. Moreover, the dried gypsum products produced therefrom tend to have a certain weakness, which can be attributed to quantities of residual water which have remained in the crystal matrix on curing. For this reason, corresponding products exhibit less hardness than gypsum products prepared with smaller amounts of mixing water.

Gypsum for the purposes of the present invention, therefore, is more preferably β-calcium sulfate hemihydrate. β-Calcium sulfate hemihydrate of the invention is especially suitable here for use in gypsum-based self-leveling screed.

The formulation of gypsum-based self-leveling screeds has to date been possible only with binders based on anhydride or α-hemihydrate. Binders of these kinds represent gypsum modifications which have a very low water demand and are therefore high-strength binders. Nevertheless, both in terms of price and in terms of availability, the two components display distinct disadvantages relative to β-hemihydrate. The use of β-hemihydrate, however, is not possible according to the prior art, since the high water demand means that the resulting strengths are too low to produce a self-leveling screed in sufficient quality. It has emerged that plasticizers based on lignosulfonate, melamine sulfonate, and polynaphthalene sulfonate are not able adequately to reduce the water demand of β-hemihydrate.

The use of polycarboxylic ethers allows sufficient reduction of water, but the development rate of polycarboxylate ethers conforming to the prior art is too slow for machine-applied self-leveling screeds.

In the processing of a screed mixture of this kind with a machine, there is a sharp increase in viscosity at the start, and so the mixture either can no longer be processed homogeneously or else the operator on the building site compensates for the viscosity by adding water, in which case there is separation in the material. Furthermore, the excess water, which later evaporates, results in significantly impaired mechanical strength, stability, and durability of adhesion.

Machine-applied, gypsum-based, self-leveling screeds based on β-calcium sulfate hemihydrate of the invention can be worked, in contrast, like the anhydrite- or α-hemihydrate-based self-leveling, gypsum-based screeds known in the prior art, and have comparable or even better mechanical strength, stability, and durability of adhesion.

The pulverulent mixture of the invention which comprises the composition of the invention may in particular also comprise a binder mixture. In the present context this means mixtures of at least two binders from the series of cement, pozzolanic and/or latent hydraulic binder, white cement, specialty cement, calcium aluminate cement, calcium sulfoaluminate cement, and the various water-containing and water-free calcium sulfates. They may then optionally comprise further additives as well.

In the context of the present invention, the pulverulent mixture ought preferably to be in dry form, this meaning that it has a Karl-Fischer water content of less than 5 wt %, preferably less than 1 wt %, and more preferably of less than 0.1 wt %.

It is preferred for the powder to have an average particle size of between 0.1 and 1000 μm, more preferably between 1 and 200 μm. The particle size here is determined by means of laser diffractometry.

The pulverulent mixture of the invention, comprising the composition of the invention, comprises preferably between 2 and 99.9 wt %, more particularly between 8 and 50 wt %, and more preferably between 10 and 40 wt % of an inorganic binder.

The examples which follow are intended to elucidate the invention in more detail.

EXAMPLES

Gel Permeation Chromatography

Sample preparation for determination of the molar weight was carried out by dissolving copolymer solution in the GPC eluent, giving a polymer concentration in the GPC eluent of 0.5 wt %. Thereafter this solution was filtered through a syringe filter with polyethersulfone membrane and a pore size of 0.45 µm. The injection volume of this filtrate was 50-100 µl.

The average molecular weights were determined on a GPC instrument from Waters with the model name Alliance 2690 with a UV detector (Waters 2487) and RI detector (Waters 2410).

Columns: Shodex SB-G Guard Column for SB-800 HQ series
Shodex OHpak SB 804HQ and 802.5HQ
(PHM gel, 8×300 mm, pH 4.0 to 7.5)
Eluent: 0.05 M aqueous ammonium formate/methanol mixture=80:20 (parts by volume)
Flow rate: 0.5 ml/min
Temperature: 50° C.
Injection: 50 to 100 µl
Detection: RI and UV The molecular weights of the copolymers were determined relative to polyethylene glycol standards from the company PSS Polymer Standards Service GmbH. The molecular weight distribution curves of the polyethylene glycol standards were determined by means of light scattering. The masses of the polyethylene glycol standards were 682000, 164000, 114000, 57100, 40000, 26100, 22100, 12300, 6240, 3120, 2010, 970, 430, 194, and 106 g/mol.

Composition of the Copolymers

The synthesis of the copolymer used is described for example in WO2006133933 page 12, line 5 to page 13, line 26. The composition of the copolymer used is as follows:

TABLE 1

| Co-polymer | Mol of acrylic acid | Mol of macromonomer | Macromonomer | Mw (g/mol) | Solids % |
|---|---|---|---|---|---|
| A | 5 | 1 | VOBPEG-3000 | 32 000 | 51 |

The abbreviation VOBPEG-3000 stands for vinyoxybutyl-polyethylene glycol with a molar mass of 3000 g/mol, i.e. of formula (III) k=0, l=0, and n~68.

General Preparation Example for Copolymers in White Oil

Inventive

A 5-liter vessel is charged with 400 g of white oil (ADDINOL WX 32).

Added to this initial charge are 32 g of the emulsifier Rhodibloc RS (dispersion of amphiphilic diblock copolymers with a hydrophilic block and a hydrophobic block). The mixture is mixed by means of a paddle stirrer. Metered into this mixture with stirring are 800 g of a 50 wt % strength aqueous solution of the copolymer (see table 1) in about 1 minute.

This mixture is then mixed using the paddle stirrer at around 800 revolutions/minute (rpm) for 30 minutes. After that, for 5 minutes, an Ultra Turrax is introduced, at 24000 revolutions/minute (rpm). The resulting white emulsion is placed in a 2-liter flask. The water is then stripped off slowly on a rotary evaporator, without boiling, at 70° C., with the pressure being lowered slowly from 400 mbar to 40 mbar during the evaporation. The products obtained have a water content of 2 wt %.

TABLE 2

| Example | Co-polymer | Amount of copolymer | White oil | Emulsifier | Paddle stirrer | Ultra Turrax |
|---|---|---|---|---|---|---|
| 1 | A | 800 g 50% strength solution | 400 g | 32 g Rhodibloc RS | 30 min at 800 rpm | 5 min at 24000 rpm |

Application Examples

Pulverulent mixture (self-leveling underlayment (SLU) compound)

TABLE 3

| | Manufacturer | Parts by weight |
|---|---|---|
| Portland cement (Milke CEM I 52.5N) | Heidelberg Cement AG | 30.00 |
| Calcium aluminate cement (Fondu Ciment) | Kerneos Inc | 10.00 |
| Calciumsulfate binder CAB 30 | Lanxess AG | 6.00 |
| Calcium carbonate (Omyacarb 6AL) | Omya GmbH | 10.00 |
| Calcium carbonate (OMYACARB 15AL) | Omya GmbH | 15.00 |
| Calcium carbonate (Omyacarb 130AL) | Omya GmbH | 26.38 |
| Lithium carbonate | Chemmetall GmbH | 0.10 |
| Defoamer (Vinapor DF 9010 F) | BASF Construction Polymers GmbH | 0.15 |
| Dispersible powder (Vinnapas 5023L) | Wacker AG | 2.00 |
| Tartaric acid | DU Chemie GmbH | 0.12 |

The pulverulent mixture is prepared by homogenizing the various components (see table 3) for 10 minutes in an SK450 shaker (from Fast&Fluid Management B.V.).

300 g in each case of the pulverulent mixture are admixed with 0.25 wt % of copolymer A, based on the pulverulent mixture, in a variety of ways (see table 4a).

In accordance with the invention, copolymer A is added in the form of a white oil emulsion to the pulverulent preparation (see protocol D in table 4a and example 2 in table 4b). The pulverulent mixture here is mixed with the emulsion of copolymer A (see example 1 in table 2) in white oil with a shearing energy of 8000 rpm in a Grindomix GM 200 (Retsch GmbH).

As comparative example C1, the pulverulent mixture is admixed with the pulverulent component A, after which mixing water is added (protocol A, table 4a). In comparative example C2, the pulverulent mixture is mixed separately with white oil and polymer powder at 8000 rpm (protocol B, table 4a), and then the mixing water is added. In comparative example 3, the mixing water, admixed beforehand with the white oil/polymer emulsion, is added to the pulverulent mixture (protocol C, table 4a).

To assess the development of the dispersing action of the copolymer A over time, following addition of the mixing water, the pulverulent mixture is placed in a beaker and stirred at 500 revolutions per minute using an axial stirrer. Then the mixing water (63 g of water, or 21 wt %, based on the weight of the pulverulent mixture) is added and a measurement is made of the time after which, visually, the consistency of the resulting fresh mortar is homogeneous (see table 4b).

TABLE 4a

Mixing protocols

| Protocol | Liquid phase | Solid phase |
|---|---|---|
| A | Mixing water | SLU formulation mixed with polymer A powder |
| B | Mixing water | White oil admixed to SLU formulation at shear rate of 8000 rpm, then polymer A mixed with this |
| C | Mixing water + white oil/polymer A emulsion | Untreated SLU formulation |
| D | Mixing water | SLU formulation mixed with a 50% white oil/polymer A emulsion at 8000 rpm |

TABLE 4b

Mixing speed on addition of the polymer/white oil emulsions

| | Example | | | |
|---|---|---|---|---|
| | C1 | C2 | C3 | 2 |
| Protocol | A | B | C | D |
| Shear rate [rpm] | | 8000 | | 8000 |
| Pulverulent mixture from table 2 | 299.25 | 298.5 | 298.5 | 298.5 |
| Polymer A powder [g] | 0.75 | 0.75 | | |
| White oil [g] | | 0.75 | | |
| Emulsion from example 1 [g] | | | 1.5 | 1.5 |
| H$_2$O [g] | 60 | 60 | 60 | 60 |
| Time until mixture homogeneous [s] | 15 | 12 | 21 | 6 |

Table 4b shows that the pulverulent mixture which has been treated, before the mixing water is added, with an emulsion of the copolymer A in white oil, according to the invention (example 2), displays a much quicker development of the dispersing effect over time of the copolymer A, after addition of the mixing water, than in the case of examples C1 to C3.

Admixing Finely Ground Limestone with the Emulsion of the Copolymer A in White Oil, According to the Invention

Example 3

15 g of finely ground limestone (Omyacarb 20 BG) and 1.5 g of a 50% emulsion of the copolymer A in white oil (see example 1 in table 2) are homogenized in a Grindomix GM 200 (Retsch GmbH) with a shear rate of 5000 revolutions per minute for 5 minutes. The product is a readily free-flowing, copolymer-coated, finely ground limestone.

Example 4

The finely ground limestone thus treated is mixed with 285 g of the pulverulent mixture according to table 3. To accomplish this, the corresponding amount of the treated finely ground limestone (see table 5) is homogenized with the pulverulent mixture for 1 minute in the SK450 shaker. Example 4 exhibits a very rapid development of the dispersing effect of the copolymer A following addition of the mixing water, with homogenization being attained after 7 seconds.

In contrast, the corresponding application example C4 (comparative example), in which the pulverulent copolymer A together with finely ground limestone and white oil is mixed separately with the pulverulent mixture according to table 3, requires 10 seconds for homogenization.

TABLE 5

| | Application example | |
|---|---|---|
| | Example C4 amount in grams | Example 4 amount in grams |
| Pulverulent mixture according to table 2 | 285 | 285 |
| Copolymer A | 0.75 | |
| Coated finely ground limestone from example 3 | | 15 |
| White oil in mixing water | 0.75 | |
| Omyacarb 20 BG | 13.5 | |
| Water | 57 | 57 |
| Time until mixture homogeneous [s] | 10 | 7 |

The invention claimed is:

1. A composition comprising
   1 to 70 wt % of at least one copolymer obtainable by polymerizing a mixture of monomers comprising
   (I) at least one ethylenically unsaturated monomer which comprises at least one radical from the series carboxylic acid, carboxylic salt, carboxylic ester, carboxylic amide, carboxylic anhydride, and carboxylic imide, and
   (II) at least one ethylenically unsaturated monomer having a polyalkylene oxide radical,
   0.01 to 10 wt % of at least one emulsifier, and
   29 to 98 wt % of at least one hydrocarbon liquid at 20° C. or a hydrocarbon mixture.

2. The composition according to claim 1, wherein the at least one hydrocarbon liquid at 20° C. or hydrocarbon mixture comprises at least one aliphatic hydrocarbon or a hydrocarbon mixture.

3. The composition according to claim 1, wherein the hydrocarbons or hydrocarbon mixtures used possess a kinematic viscosity (ISO 3014 and DIN 51 562/T1) at 20° C. in the range from 30 to 150 mm$^2$/s.

4. The composition according to claim 1, wherein the ethylenically unsaturated monomer (I) is represented by at least one of the following formulae from the group (Ia), (Ib) and (Ic)

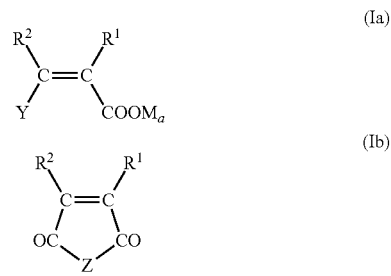

wherein
R$^1$ and R$^2$ independently of one another are hydrogen or an aliphatic hydrocarbon radical having 1 to 20 C atoms,
Y is H, —COOM$_a$, —CO—O(C$_q$H$_{2q}$O)$_r$—R$^3$, or —CO—NH—(C$_q$H$_{2q}$O)$_r$—R$^3$
M is hydrogen, a mono- or divalent metal cation, ammonium ion, or an organic amine radical,
a is 1 or 2, $R^3$ is hydrogen, an aliphatic hydrocarbon radical having 1 to 20 C atoms, a cycloaliphatic hydrocarbon radical having 5 to 8 C atoms, or an optionally substituted aryl radical having 6 to 14 C atoms, q independently at each occurrence for each $(C_qH_{2q}O)$ unit is the same or different and is 2, 3, or 4, r is 0 to 200, and Z is O or $NR^3$,

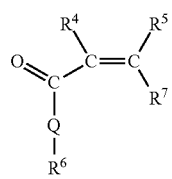

wherein $R^4$ and $R^5$ independently of one another are hydrogen or an aliphatic hydrocarbon radical having 1 to 20 C atoms, a cycloaliphatic hydrocarbon radical having 5 to 8 C atoms, or an optionally substituted aryl radical having 6 to 14 C atoms, Q is identical or different and is also represented by NH, $NR^3$ or O, where $R^3$ possesses the definitions stated above, $R^6$ is identical or different and is also represented by $(C_nH_{2n})$—$SO_3H$ with n=0, 1, 2, 3, or 4, $(C_nH_{2n})$—OH with n=0, 1, 2, 3, or 4; $(C_nH_{2n})$—$PO_3H_2$ with n=0, 1, 2, 3, or 4, $(C_nH_{2n})$—$OPO_3H_2$ with n=0, 1, 2, 3, or 4, $(C_6H_4)$—$SO_3H$, $(C_6H_4)$—$PO_3H_2$, $(C_6H_4)$—$OPO_3H_2$ and $(C_nH_{2n})$—$NR^8_b$ with n=0, 1, 2, 3, or 4 and b=2 or 3, $R^7$ is H, —$COOM_a$, —CO—O$(C_qH_{2q}O)_r$—$R^3$, or —CO—NH—$(C_qH_{2q}O)_r$—$R^3$, where $M_a$, $R^3$, q, and r possess definitions stated above, and $R^8$ is hydrogen, an aliphatic hydrocarbon radical having 1 to 10 C atoms, a cycloaliphatic hydrocarbon radical having 5 to 8 C atoms, or an optionally substituted aryl radical having 6 to 14 C atoms.

5. The composition according to claim 1, wherein the ethylenically unsaturated monomer (II) is of formula

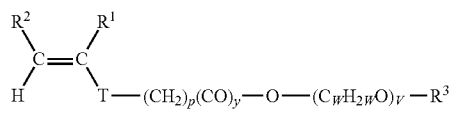

wherein p is an integer between 0 and 6, y is 0 or 1, v is an integer between 3 and 250, w independently at each occurrence for each $(C_wH_{2w}O)$ unit is identical or different and is an integer between 2 and 18, T is oxygen or a chemical bond, $R^1$ and $R^2$ are independently of one another are hydrogen or an aliphatic hydrocarbon radical having 1 to 20 C atoms, and $R^3$ is hydrogen, an aliphatic hydrocarbon radical having 1 to 20 C atoms, a cycloaliphatic hydrocarbon radical having 5 to 8 C atoms, or an optionally substituted aryl radical having 6 to 14 C atoms.

6. The composition according to claim 1, wherein the fraction of the monomer (I) in the copolymer is 5 to 90 mol % and the fraction of the monomer (II) in the copolymer is 10 to 95 mol %.

7. The composition according to claim 1, wherein the emulsifier comprises at least one emulsifier suitable for emulsion polymerizations.

8. The composition according to claim 1, wherein the emulsifier is a dispersion based on copolymers.

9. A process for preparing a composition according to claim 1, comprising the steps of:
   carrying out the polymerization of the monomers (I) and (II) in a water-containing solvent, the water content of the overall reaction mixture being more than 20 wt %,
   admixing the polymerization product with the emulsifier and with the at least one hydrocarbon liquid at 20° C. or hydrocarbon mixture, and
   removing the water.

10. The process according to claim 9, wherein shearing power of more than $10^3$ W/$m^3$ is introduced into the composition before the water is removed.

11. The process according to claim 9, wherein the shearing energy is introduced with at least one apparatus from the series toothed colloid mill, bead mill, ultrasound devices, rotor-stator, and dissolver disk.

12. A pulverulent mixture comprising 0.01 to 50 wt % of a composition according to claim 1.

13. A pulverulent mixture according to claim 12, wherein the pulverulent mixture comprises 0.01 to 10 wt % of a composition comprising:
   1 to 70 wt % of at least one copolymer obtainable by polymerizing a mixture of monomers comprising
      (I) at least one ethylenically unsaturated monomer which comprises at least one radical from the series carboxylic acid, carboxylic salt, carboxylic ester, carboxylic amide, carboxylic anhydride, and carboxylic imide, and
      (II) at least one ethylenically unsaturated monomer having a polyalkylene oxide radical,
   0.01 to 10 wt % of at least one emulsifier, and
   29 to 98 wt % of at least one hydrocarbon liquid at 20° C. or a hydrocarbon mixture.

14. The method for accelerating the development over time of the dispersing action of the copolymer following addition of the mixing water, where 0.01 to 10 wt % of the composition of claim 1 is used, based on the overall mass.

15. The method according to claim 14, wherein the pulverulent mixture comprises at least one member selected from the group consisting of an inorganic binder and/or an inorganic filler.

* * * * *